Patented May 2, 1950

2,506,492

UNITED STATES PATENT OFFICE 2,506,492

STABILIZED SULFITE SOLUTIONS

Louis De Mytt and Raymond E. Reed, St. Paul, Minn., assignors to Raymond Laboratories, Inc., St. Paul, Minn., a corporation of Minnesota No Drawing. Application July 27, 1946, Serial No. 686,718

5 Claims. (Cl. 167—87.1)

The present invention relates to stabilized sulfite solutions and more particularly to such solutions which are resistant to oxidation.

Aqueous sulfite solutions tend to deteriorate with the passage of time when they are exposed to the atmosphere and other sources of oxygen. Sulfite solutions intended for use in the permanent waving of hair, for example, are commonly sold in containers holding enough solution for several permanent waves. Unless the manufacturer is careful to provide the sulfite waving lotion in tightly sealed containers and unless the beautician uses the entire contents of the container within a relatively short time, say within a day or two, significant deterioration in the effectiveness of the solution is likely to result. In many instances it has been found that the solutions are seriously deteriorated even before they reach the beauty shop, and it often happens that the bottle remains in the shop for weeks and even for months before it is completely used. Every time the container is opened and air is allowed to enter, the solution is subjected to deterioration, which proceeds at a more and more rapid rate as the air space in the bottle increases after each use. There is also the constantly present hazard that the bottle may be inadvertently left open to the air for a time before the stopper is replaced.

For these and other reasons many lotions containing sulfite are rendered practically useless for permanent waving purposes by exposure to atmospheric oxygen before they are used. Similar problems are encountered with other types of sulfite solutions in other industrial and commercial applications.

It is known that such deterioration can be suppressed to some extent by the addition of antioxidants such as certain alcohols, quinones and amines, for example, mannitol, glycol, lauryl alcohol, hydroquinone and triethanolamine. Some of these agents are objectionable because they impart color and staining properties to the sulfite solutions, thus rendering them unfit for many uses, and all of them are ineffective to prevent serious loss of reducing power when a sulfite solution containing them is exposed to the air over prolonged periods of time. Further, many of these agents are themselves not sufficiently stable in sulfite solutions to retain their antioxidant power long enough to be of practical value.

Deterioration of sulfite solutions through oxidation is accelerated by the presence in the solution of various metals which appear to exert a catalytic effect. We have found that copper is one of the worst offenders in this respect and that manganese, iron, and cobalt also promote oxidation. It has been found, however, that oxidation occurs in sulfite solutions exposed to the atmosphere in spite of the most painstaking efforts to exclude all metal contaminants. From this it appears that the presence of a catalytic metal is not essential to the deterioration of the sulfite solution.

The resistance of sulfite solutions to deterioration by oxidation can be improved by the use in conjunction with antioxidants of metal deactivating agents such as organic materials which form a complex with the metals and thus remove them from the sphere of action. It is difficult or impossible to exclude these metals completely from sulfite solutions which are manufactured on a commercial scale. They may be present as impurities in the water supply or may originate from metallic piping, bottling equipment, and from the reaction vessels in which the solutions are processed. The metallic contaminants show a significant catalytic activity even when they are present in such small amounts as a few parts per million.

The presence of an antioxidant in the sulfite solutions tends to offset the catalytic effect of the metals, but even the most effective of the known antioxidants will not completely prevent deterioration of solutions which contain the catalytic metals. The practical necessity of employing a metal deactivator in association with the antioxidant not only adds to the cost of the solution but complicates the problem of selecting these two stabilizing factors so that they will not detract, individually or collectively, from the usefulness of the sulfite solution for the intended purpose.

An object of the present invention is to provide sulfite compositions of improved stability. Another object is to provide sulfite solutions of improved resistance to deterioration by oxidation notwithstanding the presence therein of metallic contaminants which promote oxidation.

A further object is to provide sulfite solutions of improved stability and resistance to oxidation but which, nevertheless, are free from color and staining properties and otherwise suitable for general use. An additional object is to provide sulfite solutions of improved resistance to deterioration by oxidation which will retain this improved resistance over prolonged periods of time.

An additional object is to provide permanent waving lotions which contain a sulfite and which show improved resistance to deterioration by exposure to the air.

The present invention provides a class of sulfite compositions which are remarkably resistant to deterioration when they are exposed to the atmosphere or other sources of oxygen. Solutions of these compositions are highly resistant to oxidation even when they contain relatively large proportions of the metals which promote oxidation of sulfite solutions.

Generally the compositions of the present invention comprise sulfite containing compositions which include one or more compounds from the class of water-soluble amino polycarboxylic acids and salts thereof. These compounds may be monoamino or polyamino compounds.

An example of a member of this class which has been found to be effective is the tri-sodium salt of triacetic acid amine, which has the structural formula:

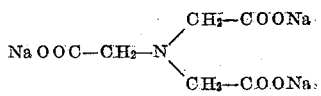

Another example of a member of this class which has been found to be effective is sodium versinate. This is a nitrogenous substance which behaves similarly to the tetra sodium salt of ethylene diamine tetra acetic acid in the presence of a sulfide and protects sodium sulfite solutions against deterioration by oxidation even though the solution contains one or more of the metals which promote oxidation.

Particularly effective compounds belonging to this class are the water soluble alkylene polyamine polyacetic acids having the general formula:

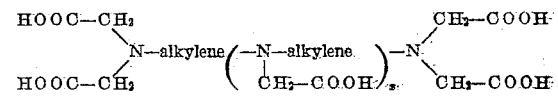

wherein x is 0 or a positive integer, and the alkylene groups contain not more than four carbon atoms each, and salts thereof.

A typical example of the compounds of this latter class which have been found to be highly effective for our purposes is is the tetra sodium salt of ethylene diamine tetra acetic acid, which has the structural formula:

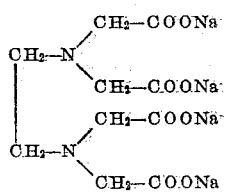

We have found sulfite solutions containing this compound to be very resistant to deterioration by oxidation even when the sulfite solutions contain the said catalytic metals in concentrations which render the known antioxidants largely ineffective.

The following examples, in which the parts are by weight, illustrate sulfite solutions in accordance with the present invention which are resistant to deterioration by oxidation:

Example I

A 1 N aqueous sodium sulfite solution was prepared and buffered to a pH of about 9 by the addition of approximately 6% of ammonium carbonate. To this solution was added 1% of the tetra sodium salt of ethylene diamine tetra acetic acid.

Example II

A 1 N aqueous sodium sulfite solution was prepared and buffered to a pH of about 9 by the addition of approximately 6% of ammonium carbonate. To this solution was added 1% of the tri sodium salt of tri acetic acid amine.

Example III

A 1 N aqueous sulfite solution was prepared and buffered to a pH of about 9 by the addition of approximately 6% of ammonium carbonate. To this solution was added 1% of tetra sodium versinate.

The stabilized compositions of these examples were observed to be free from color and staining properties.

As an example of the resistance of the sulfite solutions of the present invention to oxidation, a 20 ml. portion of an aqueous sulfite solution, buffered to a pH of about 9 by the addition of about 6% of ammonium carbonate, containing 1% by weight of the tetra sodium salt of ethylene diamine tetra acetic acid and 10 parts per million of copper showed no significant loss of sulfite, as determined iodimetrically, after 24 hours of vigorous agitation in a 50 ml. Erlenmeyer flask with free access of air.

It has been found that sulfite solutions which contain a sulfite and a relatively small amount of the water-soluble amino polycarboxylic acid or salt thereof are effectively resistant to deterioration by oxidation. Sulfite solutions containing the tetra sodium salt of ethylene diamine tetra acetic acid, for example, in an amount as small as 0.025% (based on the weight of the sulfite solution) show an appreciable improvement in resistance to oxidation as compared with a similar sulfite solution which does not contain the tetra sodium salt of ethylene diamine tetra acetic acid. Generally, sulfite solutions containing less than 5% of the water-soluble amino polycarboxylic acid or salt thereof are preferred, but larger proportions may be used.

The sulfite compositions of the present invention comprise various types of sulfites, for example, regular sulfite, bisulfite and metabisulfite.

These compositions may be prepared dry and then subsequently, for example, after shipment and storage, be converted to a stabilized sulfite solution by the addition of water.

We claim:

1. Stable alkaline sulfite hair waving solution comprising an alkaline sulfite salt and an alkaline buffering salt to buffer the solution thereof in the substantially alkaline pH range, dissolved in water containing small quantities of multivalent ions of at least one metal selected from the group consisting of copper, cobalt, manganese and iron normally tending to accelerate oxidation of the sulfite and a small quantity of a sequestering agent for said ions, selected from the group consisting of water-soluble tertiary amino polycarboxylic acids and salts thereof.

2. Stable alkaline sulfite hair waving solution comprising an alkaline sulfite salt buffered with an alkaline carbonate to a substantially alkaline pH range, dissolved in water containing small quantities of multivalent ions of at least one metal selected from the group consisting of copper, cobalt, manganese and iron, normally tending to accelerate oxidation of the sulfite and a small quantity of a sequestering agent for said ions, selected from the group consisting of water-soluble tertiary amino polycarboxylic acids and salts thereof.

3. Stable alkaline sulfite hair waving solution comprising an alkaline sulfite and an alkaline buffering salt for buffering the solution thereof in the substantially alkaline pH range, dissolved in water containing small quantities of multivalent ions of at least one metal selected from the group consisting of copper, cobalt, manganese and iron normally tending to accelerate oxidation of the sulfite and a small quantity of a sequestering agent for said ions selected from the group consisting of compounds having the general formula

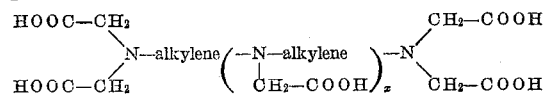

in which x is from zero to a positive integer and the alkylene groups contain not more than 4 carbon atoms each, and salts thereof.

4. Stable alkaline sulfite hair waving solution comprising an alkaline sulfite salt and an alkaline buffering salt for buffering the solution thereof in the substantially alkaline pH range, dissolved in water containing small quantities of multivalent ions of at least one metal selected from the group consisting of copper, cobalt, manganese and iron normally tending to accelerate oxidation of the sulfite and a small quantity of a sequestering agent for said ions comprising a soluble salt of ethylene diamine tetra acetic acid.

5. Stable alkaline sulfite hair waving solution comprising an alkaline sulfite salt and an alkaline buffering salt for buffering the solution thereof in the substantially alkaline pH range, dissolved in water containing small quantities of multivalent ions of at least one metal selected from the group consisting of copper, cobalt, manganese and iron normally tending to accelerate oxidation of the sulfite and a small quantity of a sequestering agent for said ions comprising a soluble salt of tri acetic acid amine.

LOUIS DE MYTT.
RAYMOND E. REED.

REFERENCES CITED

The following references are of record in the file of this patent:

UNITED STATES PATENTS

| Number | Name | Date |
|---|---|---|
| 1,869,469 | Divine | Aug. 2, 1932 |
| 2,061,709 | Malone | Nov. 24, 1936 |
| 2,073,923 | Crocker | Mar. 16, 1937 |
| 2,110,274 | Mikeska | Mar. 8, 1938 |
| 2,168,181 | Ulrich | Aug. 1, 1939 |
| 2,420,122 | Chenicek | May 6, 1947 |

FOREIGN PATENTS

| Number | Country | Date |
|---|---|---|
| 601,078 | Germany | Aug. 7, 1934 |

Certificate of Correction

Patent No. 2,506,492 May 2, 1950

LOUIS DE MYTT ET AL.

It is hereby certified that errors appear in the printed specification of the above numbered patent requiring correction as follows:

Column 1, line 40, for "glycol" read *glycerol*; column 3, line 30, for "sulfide" read *sulfite*; column 4, line 20, for the indistinct numeral after the word "about" read *9*;

and that the said Letters Patent should be read with these corrections therein that the same may conform to the record of the case in the Patent Office.

Signed and sealed this 18th day of July, A. D. 1950.

[SEAL]

JOE E. DANIELS,
*Assistant Commissioner of Patents.*